(12) United States Patent
Lunsford

(10) Patent No.: US 6,375,346 B1
(45) Date of Patent: Apr. 23, 2002

(54) METHOD FOR DETECTING THE SPALLING OF A LAYER OF BUILDUP OF A REFRACTORY LINING IN A METALLURGICAL FURNACE

(75) Inventor: Mark Edwin Lunsford, Hoover, AL (US)

(73) Assignee: USX Corporation, Pittsburgh, PA (US)

( * ) Notice: Subject to any disclaimer, the term of this patent is extended or adjusted under 35 U.S.C. 154(b) by 0 days.

(21) Appl. No.: 09/499,487

(22) Filed: Feb. 7, 2000

(51) Int. Cl.⁷ .......................... G01K 7/00; G01N 25/00
(52) U.S. Cl. ................... 374/4; 374/45; 374/7
(58) Field of Search .................. 374/4–5, 183, 374/185, 208, 7, 43, 45, 166, 179, 6

(56) References Cited

U.S. PATENT DOCUMENTS

| | | | |
|---|---|---|---|
| 4,358,953 A | | 11/1982 | Horiuchi et al. ............... 374/7 |
| 4,412,090 A | | 10/1983 | Kawate et al. .............. 136/230 |
| 4,786,321 A | * | 11/1988 | Hoster et al. .................. 75/43 |
| 4,995,732 A | * | 2/1991 | Lingorski et al. ........... 374/139 |
| 5,147,137 A | * | 9/1992 | Thiesen ....................... 374/139 |
| 5,158,366 A | * | 10/1992 | Nagai et al. ................. 374/183 |
| 5,811,057 A | * | 9/1998 | Hubble et al. .............. 266/275 |
| 5,961,214 A | | 10/1999 | Groth et al. .................... 374/7 |

* cited by examiner

Primary Examiner—Diego Gutierrez
Assistant Examiner—Gail Verbitsky
(74) Attorney, Agent, or Firm—William F. Riesemeyer, III

(57) ABSTRACT

A method is provided for detecting the spalling off of a significant portion of buildup of alkali and/or metal from the refractory lining of a metallurgical furnace. The method includes monitoring the rate of change of temperature of the refractory lining at a plurality of spaced locations and determining when the rate of change of temperature at a predetermined number of such locations exceeds a first threshold level that a significant portion of buildup has spalled off. The invention is particularly applicable to blast furnaces and permits the addition of heat to be made to the molten metal in the furnace before the spalled off portion descends through the furnace shaft and reaches the molten metal.

10 Claims, 4 Drawing Sheets

FURNACE STACK TEMPERTURES ALARMS

DEGREES PER MINUTE THRESHOLD = 0.5

|  | 1 | 2 | 3 | 4 | 5 | 6 | 7 | 8 |
|---|---|---|---|---|---|---|---|---|
| ROW 25 | 0. G 551. | 0. G 469. | 0. G 375. | 0. G 241. | 0. G 314. | 0. G 138. | 0. G 285. | 0. G 437. |
| ROW 19 | 0. G 731. | 0. G 712. | 0. G 666. | 0. G 502. | 0. G 498. | 0. G 413. | 0. G 581. | 0. G 729. |
| ROW 15 | 0. G 820. | 0. G 502. | 0. G 833. | 0. G 810. | 0. G 691. | 0. G 754. | 0. G 634. | 0. G 886. |
| ROW 12 | 0. G 643. | 0. G 659. | 0. G 565. | 92. P 649. | 239. P 774. | 103. R 921. | 146. R 768. | 0. G 498. |
| ROW 9 | 0. G 419. | 0. G 479. | 0. G 534. | 52. R 829. | 160. R 856. | 0. G 807. | 0. G 497. | 0. G 547. |
| ROW 6 | 0. G 476. | 0. G 1202. | 0. G 367. | 0. G 822. | 338. R 480. | 0. G 663. | 0. G 499. | 0. G 539. |
| ROW 3 | 0. G 651. | 0. G 924. | 0. G 284. | 0. G 655. | 0. G 379. | 0. G 515. | 0. G 418. | 0. G 746. |

FIG. 3

FURNACE STACK TEMPERTURES ALARMS
DEGREES PER MINUTE THRESHOLD = 0.5

|  | 1 | 2 | 3 | 4 | 5 | 6 | 7 | 8 |
|---|---|---|---|---|---|---|---|---|
| ROW 25 | 0. G 628. | 0. G 516. | 0. G 459. | 0. G 280. | 0. G 337. | 0. G 129. | 0. G 404. | 0. G 490. |
| ROW 19 | 0. G 859. | 0. G 782. | 0. G 718. | 0. G 550. | 0. G 549. | 0. G 453. | 0. G 736. | 0. G 920. |
| ROW 15 | 0. G 749. | 0. G 917. | 0. G 835. | 35. R 809. | 40. R 664. | 53. R 689. | 64. R 772. | 0. G 735. |
| ROW 12 | 0. G 887. | 0. G 1079. | 35. Y 960. | 74. R 925. | 110. R 873. | 55. R 984. | 233. P 784. | 0. G 437. |
| ROW 9 | 0. G 521. | 0. G 689. | 0. G 992. | 43. Y 730. | 48. Y 903. | 134. P 653. | 167. P 430. | 0. G 929. |
| ROW 6 | 0. G 793. | 0. G 884. | 0. G 516. | 0. G 658. | 0. G 968. | 0. G 489. | 0. G 456. | 0. G 404. |
| ROW 3 | 0. G 637. | 0. G 507. | 0. G 313. | 0. G 377. | 0. G 644. | 0. G 502. | 0. G 450. | 0. G 567. |

FIG. 4

METHOD FOR DETECTING THE SPALLING OF A LAYER OF BUILDUP OF A REFRACTORY LINING IN A METALLURGICAL FURNACE

TECHNICAL FIELD

The present invention is of a method for detecting the spalling of a layer of alkali and/or metal buildup material from the surface of a refractory lining in a metallurgical furnace, and particularly to monitoring the rate of change of the temperature of said refractory lining at a plurality of spaced locations in order to detect spalling of said layer.

BACKGROUND ART

In the production of metal from ore in a blast furnace, for example in an iron blast furnace, a layer of deposits is formed on the interior surface of the refractory walls of the furnace shaft. The layer may consist of alkali and/or metal material. Once formed, the deposited layer tends to keep growing during operation of the furnace. Occasionally portions of the layer break away from the refractory wall and descend with the charge materials to the molten iron bath contained in the furnace hearth. The spalled off portions of the layer are commonly referred to as a scab. When the scab reaches the molten iron and dissolves, a significant loss of temperature occurs. The unexpected decrease in iron temperature causes significant changes in the distribution of chemical components such as silicon and sulfur between the molten slag and iron. Increases in sulfur content may necessitate scrapping a substantial amount of the iron produced.

U.S. Pat. No. 4,412,090 to Kawate etal, discloses a thermal sensor for detecting the temperature distribution in a deposit layer on the refractory walls of a blast furnace. The sensor provides data to be used for the development of a method to suppress the formation and growth of the deposit layer during operation of the blast furnace.

U.S. Pat. No. 4,358,953, discloses a temperature probe construction that is used in the thermal sensor of the patent to Kawate et al described above.

U.S. Pat. No. 5,961,214 to Groth et al, of common assignee with the present application, discloses a method for determining the thickness of a protective layer of solidified metal skull formed on the refractory hearth of a blast furnace. The refractory hearth has temperature probes embedded in the floor and walls of the hearth. The method includes periodically measuring temperatures indicated by the probes and determining the campaign maximum and current average temperature readings to locate two solidification isotherms representing the wear line of the refractory and the inner surface of the protective metal layer. The thickness of the protective layer is determined from the distance between the solidification isotherms.

None of the references teach or suggest a method for the detection of the spalling of significant portions of the layer of buildup on the refractory walls of a blast furnace shaft.

DISCLOSURE OF INVENTION

The present invention is of a method for detecting the spalling of a layer, for example a layer of alkali and/or metal, deposited on the interior surface of a refractory lining of a metallurgical furnace. The invention is particularly applicable to blast furnaces, especially blast furnaces for producing iron. The method includes monitoring the temperature of the refractory lining at a plurality of spaced locations as a function of time, calculating a rate of change of the temperature at each said location, establishing a first threshold level of the rate of change of temperature of said refractory lining indicative of spalling of a portion of a layer of buildup from said lining, and determining when the rate of change of temperature of said refractory of at least one of said locations exceeds said first threshold level. Preferably the method includes determining when the rate of change of temperature at a predetermined number of adjacent locations exceeds said first threshold level. This indicates that a significant portion of the layer has spalled off. Desirably a plurality of ranges of the rate of change of temperature is established as a function of time indicative of a plurality of conditions of spalling of the layer of buildup.

In a most preferred form the method further comprises providing additional heat to a bath of molten metal contained in a hearth at a lower end of the furnace when a significant portion of the layer of buildup has spalled. More preferably the additional heat provided is based upon either the number of adjacent locations at which the rate of change of temperature either exceeds said first threshold level or the number of adjacent locations within ranges indicative of spalling of the layer of buildup.

BRIEF DESCRIPTION OF THE DRAWINGS

FIG. 3 is a schematic view of a computer screen showing a visual representation of the rate of change of temperature at various locations in the refractory lining of the shaft of a blast furnace in an actual commercial trial of the invention.

FIG. 4 is a schematic view of a computer screen similar to FIG. 3 in another actual commercial trial of the invention.

MODES FOR CARRYING OUT THE INVENTION

Figure 1:
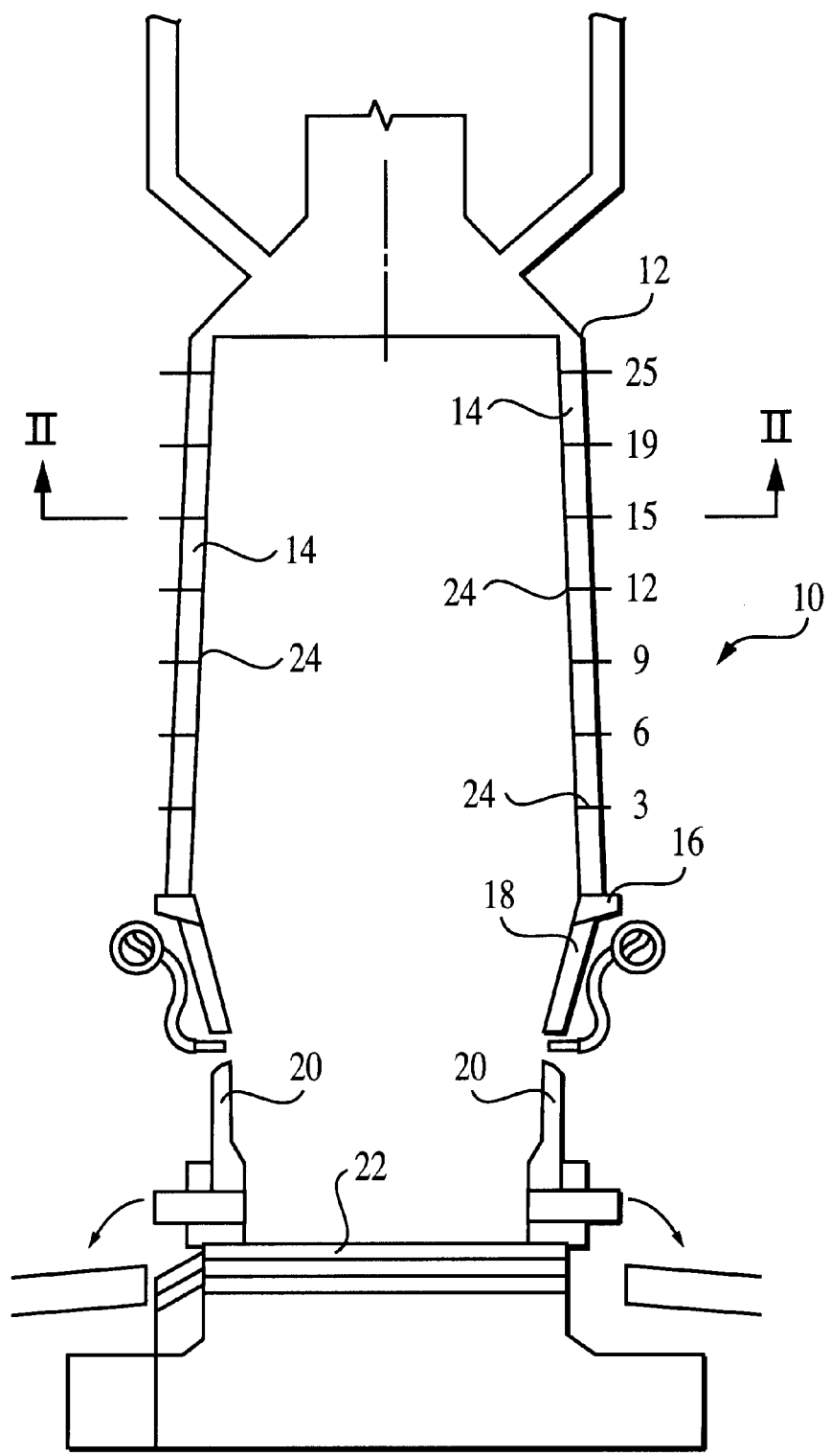
FIG. 1 is a cross sectional elevation view of a blast furnace showing the locations of temperature probes for measuring the temperature of the refractory lining in the shaft of said furnace.
Figure 2:
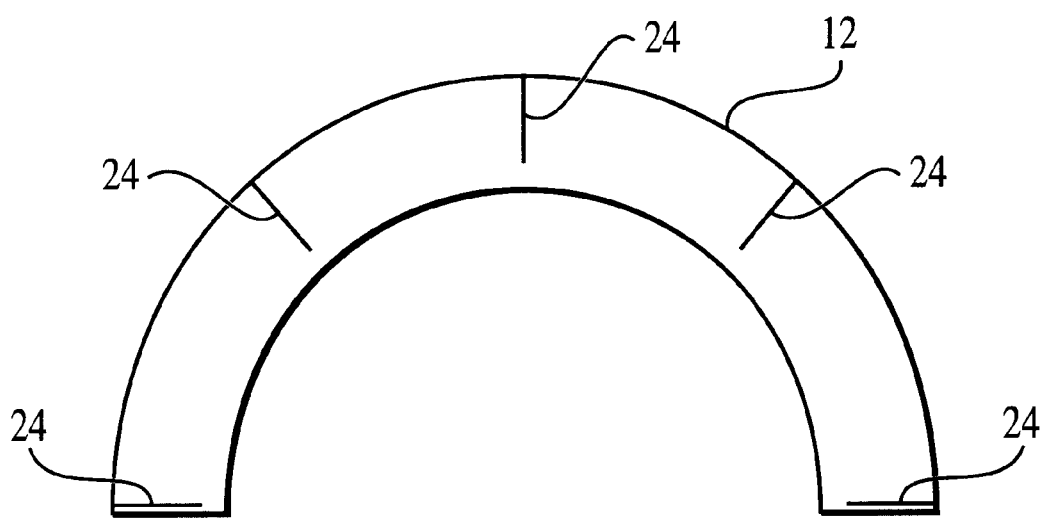
FIG. 2 is an enlarged view of a section taken at II—II of FIG. 1.

Referring to FIG. 1 a conventional iron blast furnace 10 has a shaft comprising a generally cylindrical metal shell 12 lined with refractory brick 14. The lower end of the shaft converges below mantle 16 in bosh 18 to a hearth comprising refractory lined wall 20 and refractory floor 22. Temperature probes 24 are embedded at spaced locations in the refractory brick lining of the shaft above the mantle. The temperature probes are located at spaced elevations, for example in rows 3, 6, 9, 12, 15, 19 and 25 of bricks above the mantle. The probes are equally spaced around the circumference of the lining in each row, for example at 8 equally spaced locations. Temperature probes may also be provided at spaced locations in the refractory lining of the bosh.

The temperature probes provide signals to a computer indicative of the refractory temperature at each probe location. The computer calculates the rate of change of temperature at each probe location as a function of time. This calculation may be carried out either continuously or periodically, for example, every fifteen minutes during furnace operation. The rate of change information is displayed on a computer screen, for example, as shown in FIGS. 3 and 4. Each temperature probe location is represented by a square. For example, the squares in row one represent the probes spaced circumferentially at the level of brick 3 in the furnace shaft. The calculated rate of temperature change at that location at the current time is represented by the color of the square. In FIGS. 3 and 4 the color of each square is indicated by the first letter of that color, e.g. G for green, etc. I use purple to indicate a rate of change, R, of temperature that exceeds a first threshold of 2.5° F./minute; red if the rate of change is within a range between said first threshold of 2.5° F./minute and a second threshold of 1.5° F./minute. A yellow square is used when the rate of change is within a range of 0.5° F./minute to 1.5° F./minute, a green square when the rate is within a range of −0.5 to +0.5° F./minute and blue if the rate is less than or equal to −0.5° F./minute.

The purple squares indicate that a relatively thick layer has spalled and a large temperature loss is expected in the molten metal. The red squares indicate a somewhat thinner layer has spalled and that a somewhat less but still significant temperature loss is expected in the metal. The yellow squares are a caution indicating that spalling is occurring but a temperature loss is not expected in the metal. The green square indicates no spalling is occurring. The blue squares indicate buildup of the layer is occurring on the refractory lining. The actual ranges chosen may vary with each particular furnace based on actual experience. Our computer is set to establish ranges from a single input made by the furnace operator. For example, the range of rate of change, R, for blue squares is R< or =−1.0x. The range for green squares is −1.0x<R< or =+1.0x. The range for yellow squares is +1.0x<R< or =+3.0x. The range for the red squares is +3.0x<R< or =5.0x. The range for the purple squares is >5.0x. Thus, by a single input, x, of x=0.5 the ranges of rate of change are determined. Again the actual setup of the computer may vary depending on the ranges found to be significant from actual furnace operation. In FIGS. 3 and 4 the actual temperature of the temperature probe is also displayed in each square. The lower number in each square is the actual temperature at which the rate of change, R, enters the range represented by the color of that square. The second or upper number is the number of ° F. by which the actual temperature at the present time exceeds the minimum threshold level for that square. This gives us an idea of how much the actual temperature has changed since the rate of change at that location has been within the range indicated by the color of that square. The actual temperature at that location is therefore the sum of the two numbers shown in the square.

I have found that when a group of four or more purple or red squares are adjacent to each other that a significant portion of the layer of buildup on the refractory lining has spalled off. The spalled off portion of the layer descends with the other solid materials in the furnace shaft until it reaches the molten iron in the furnace hearth. Dissolution of the spalled off portion of the layer in the molten iron and slag causes a significant temperature loss in the molten iron. This in turn changes the distribution of certain chemical elements between the slag and iron. For example, an increase in the sulfur content of the molten iron may require a substantial amount of the iron to be scrapped.

In order to prevent a significant temperature loss from occurring additional heat may be supplied to the molten iron prior to the time when the spalled off layer of buildup reaches the molten iron bath. The additional heat may be supplied by making extra charges of coke to the top of the furnace shaft. The coke descends at a faster rate through the shaft than the spalled off portion of the buildup layer and therefore reaches the molten iron before the spalled off layer. I have found from actual commercial trials of the invention that a single charge of coke reaches the molten iron bath in about the time it takes to make 45 charges to the furnace when we are making between 5 and 6 charges per hour. On the other hand a spalled off portion of buildup reaches the molten iron bath in about the time it takes to make 57 charges to the furnace at the above-mentioned rate. The number of charges that it takes for a single charge of coke to reach the molten bath in a particular furnace depends upon the charging rate and other factors. Furnace operators know this parameter and can readily determine how much additional coke to charge and the timing required in order to raise the temperature of the iron bath. By timing the extra charges of coke to the furnace, additional heat can be supplied to the molten iron before the spalled off portion reaches it. The extra coke charged can thus prevent substantial temperature loss from occurring and decrease chemical composition changes in the iron so as to eliminate the need to scrap iron that does not meet chemical specifications.

Referring to FIG. 3 there are a total of five purple or red squares that are adjacent to each other, i.e. each red or purple square is adjacent to at least one other square of red or purple color. This indicated that a large scab had spalled off from the furnace walls. During this trial no extra coke charges were made and when the scab reached the molten iron a decrease in iron temperature of 105° F. occurred. The result was that about 1600 tons of molten iron had to be scrapped because of high sulfur content. FIG. 4 shows a commercial trial in which ten purple or red squares are adjacent. Within the first hour after detecting this scab, two extra coke charges were made to the furnace. A third extra coke charge was made at three hours after detection and a fourth extra coke charge was made at about four and one-half hours after detection. The result was that a temperature loss of only 70° F. was experienced and no iron had to be scrapped. The amount of extra coke additions can be determined based on the number of purple or red squares adjacent to each other since this is an indication of the size of the scab that has spalled off. For example, a procedure I have established is as follows:

4–5 purple or red squares touching:
        Add one extra coke charge within 30 minutes after detection
        Add one extra coke charge 12 charges after detection
    6–7 purple or red squares touching:
        Add two extra coke charges within 30 minutes after detection
        Add one extra coke charge 12 charges after detection
    8–12 purple or red squares touching:
        Add two extra coke charges within 30 minutes
        Add one extra coke charge 12 charges after detection
        Add one extra coke charge 18 charges after detection It should be noted that if a whole row of squares is purple or red this is a sign that a communication link has been severed. No extra coke charges should be made in this situation. The situation should correct itself within the next 15 or 30 minutes.

This invention provides a method for detecting the spalling of a significant portion of buildup from the refractory walls of a blast furnace and permits steps to be taken to prevent temperature loss in the metal and eliminate scrapping of off-chemistry metal that may result from the temperature loss.

What is claimed is:

1. A method for detecting the spalling of a layer of buildup deposited on an interior surface of a refractory lining of a blast furnace shaft, said method comprising:
    a) monitoring the temperature of the refractory lining at a plurality of spaced locations in the shaft as a function of time;

b) calculating a rate of change of the temperature of the refractory lining at each location as a function of time;

c) establishing a first threshold level of the rate of change of the temperature of said refractory lining indicative of spalling of a portion of the layer of buildup from said lining; and d) determining that layer of buildup deposited on the interior surface of the refractory lining of the blast furnace has been spalled off when the rate of change of the temperature of said refactory lining of at least one of said locations exceeds said first threshold level.

2. The method of claim 1 wherein said determining step further includes determining when the rate of change of the temperature at a first predetermined number of adjacent locations of the refractory lining exceeds said first threshold level that a significant portion of said layer of buildup has spalled off.

3. The method of claim 1 wherein said establishing step includes establishing a plurality of ranges of the rate of change of the temperature as a function of time indicative of a plurality of conditions of spalling of the layer of buildup from said refractory lining.

4. The method of claim 3 wherein said determining step further includes determining when the rate of change of a temperature at a second predetermined number of adjacent locations of the refractory lining is within one or more of said ranges that a significant portion of said layer of buildup has spalled.

5. The method of claim 2 which further comprises providing additional heat to a bath of molten metal contained in a hearth at a lower end of the furnace shaft when a significant portion of the layer of buildup has spalled.

6. The method of claim 5 wherein said step of providing additional heat comprises charging extra coke to the furnace at the top of the shaft.

7. The method of claim 4 which further comprises providing additional heat to a bath of molten metal contained in a hearth at a lower end of the furnace shaft when a significant portion of the layer of buildup has spalled, and which further comprises determining the amount of additional heat provided based upon the number of adjacent locations at which the rate of change of the temperature falls within each of said plurality of ranges of rate of temperature change.

8. The method of claim 7 wherein said step of providing additional heat comprises charging extra coke to the furnace at the top of the shaft.

9. The method of claim 8 wherein said step of charging extra coke comprises making a plurality of extra coke charges at spaced time intervals.

10. A method for detecting the spalling of significant portions of a layer deposited on an interior surface of a refractory lining of a metallurgical furnace, said method comprising:

a) providing a plurality of temperature probes embedded in the refractory lining at spaced circumferential locations around a periphery of the furnace and at spaced elevations therein;

b) monitoring the temperatures measured by the temperature probes as a function of time;

c) determining a rate of change of a temperature of each temperature probe with respect to time;

d) determining when the rate of change of a temperature of a first temperature probe of said temperature probes exceeds a first threshold level;

e) determining whether the rate of change of the temperature of the temperature probes located adjacent to the first temperature probe exceeds the first threshold level; and f) when the rate of change of the temperature of a first predetermined number of the temperature probes at said adjacent locations exceeds said first threshold level, determining that a significant portion of the layer deposited on the refractory lining of said furnace has spalled off.

* * * * *